US006827115B1

(12) United States Patent
Van Hoose

(10) Patent No.: US 6,827,115 B1
(45) Date of Patent: Dec. 7, 2004

(54) BEAD CONSTRUCTION

(76) Inventor: John See Van Hoose, 425 Ridge Dr., Medina, OH (US) 44256

( * ) Notice: Subject to any disclaimer, the term of this patent is extended or adjusted under 35 U.S.C. 154(b) by 0 days.

(21) Appl. No.: 10/110,868
(22) PCT Filed: Oct. 18, 1999
(86) PCT No.: PCT/US99/24283
§ 371 (c)(1), (2), (4) Date: Apr. 17, 2002
(87) PCT Pub. No.: WO01/28788
PCT Pub. Date: Apr. 26, 2001
(51) Int. Cl.[7] .......................... B60C 15/00; B60C 15/04
(52) U.S. Cl. ....................... 152/539; 152/540; 152/547; 245/1.5
(58) Field of Search ................................ 152/539, 540; 245/1.5; 156/132, 399

(56) References Cited

U.S. PATENT DOCUMENTS

| 1,969,438 | A | * | 8/1934 | Warden ...................... 156/131 |
| 2,904,095 | A | | 9/1959 | Engstrom |
| 2,978,741 | A | | 4/1961 | Soderquist |
| 3,120,571 | A | | 2/1964 | Wolfer |
| 3,219,737 | A | | 11/1965 | Kilgore |
| 3,540,510 | A | | 11/1970 | Smithkey, Jr. |
| 3,900,061 | A | | 8/1975 | Curtiss, Jr. |
| 3,949,800 | A | | 4/1976 | Lejeune |
| 4,088,169 | A | * | 5/1978 | Kuroda ....................... 152/540 |
| 4,174,242 | A | | 11/1979 | Ayers et al. |
| 4,393,912 | A | | 7/1983 | Gouttebessis |
| 4,436,127 | A | | 3/1984 | Balbis et al. |
| 4,669,519 | A | | 6/1987 | Togashi et al. |
| 4,754,794 | A | * | 7/1988 | Bocquet et al. ............. 152/527 |
| 4,867,218 | A | | 9/1989 | Asano et al. |
| 5,127,456 | A | * | 7/1992 | Davriu et al. ................. 152/54 |
| 6,273,162 | B1 | * | 8/2001 | Ohara et al. ................ 152/540 |

FOREIGN PATENT DOCUMENTS

| EP | 0949091 | | 10/1999 |
| EP | 0968846 | | 1/2000 |
| GB | 2104461 | * | 3/1983 |
| JP | 4-296541 | * | 10/1992 |
| JP | 9-207525 | * | 8/1997 |
| JP | 11198617 | | 7/1999 |
| WO | WO01/28761 | | 4/2001 |

* cited by examiner

Primary Examiner—Blaine Copenheaver
Assistant Examiner—Justin Fischer
(74) Attorney, Agent, or Firm—Howard M. Cohn

(57) ABSTRACT

A pneumatic tire (300) having a tread (312), and a carcass (316) with a ply (320), oppositely disposed sidewalls (318) extending radially-inwardly from opposite sides of tread (312) and including an inner radial-end bead portion (322) with an annulus made of bead wire (344a) and with the ply (320) extending between and looped about each of the beads (324). Each of the beads (324) includes a rubber filler annulus (347) forming a bead member (348) with the bead wire annulus (344) associated therewith. The bead member (348) has a substantially circular transverse cross-section. Each of the beads (324) includes a thermoplastic cover (349) disposed in surrounding relationship the bead member (348) thereof.

10 Claims, 6 Drawing Sheets

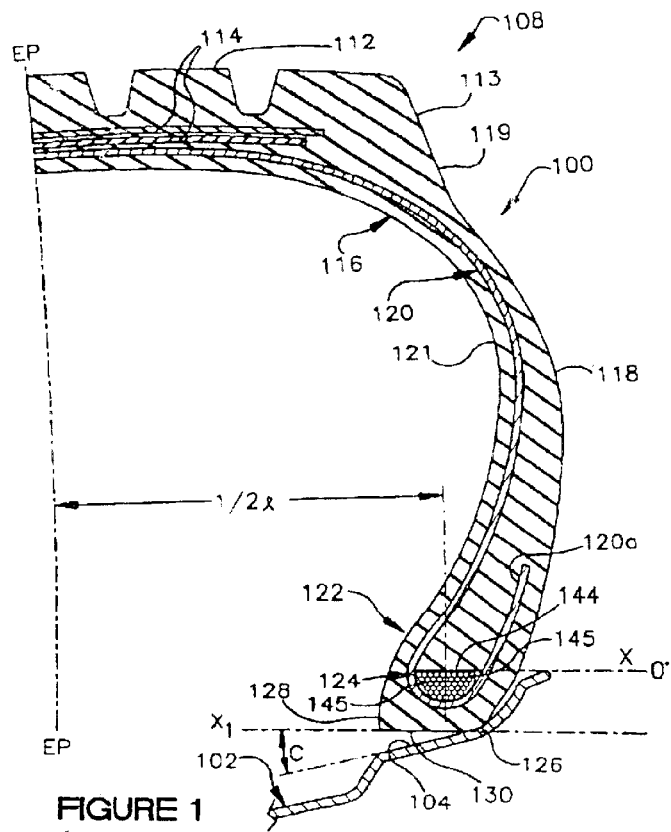
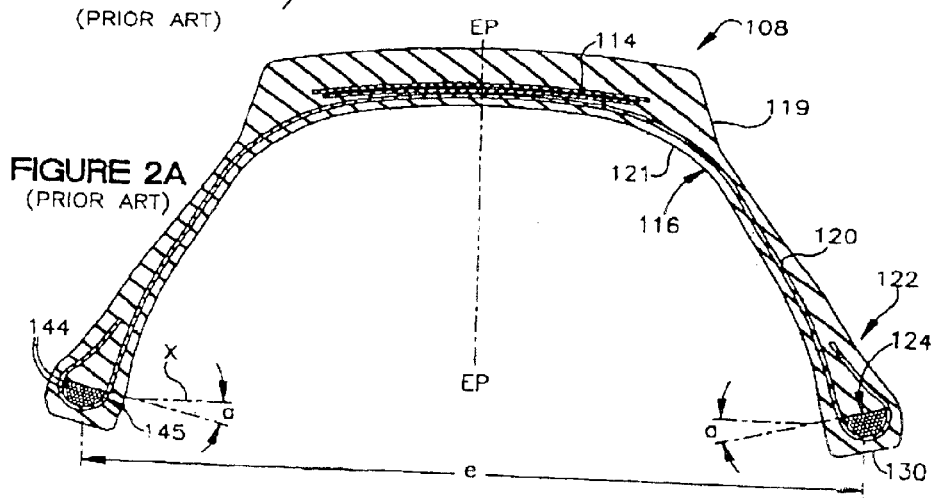
FIGURE 1
(PRIOR ART)
FIGURE 2A
(PRIOR ART)

BEAD CONSTRUCTION

RELATED APPLICATIONS

This application relates to an application entitled AN IMPROVED PROCESS FOR MANUFACTURING TIRES (Ser. No. PCT/US99/24449 filed on a concurrent date herewith) and having a common assignee with the present invention.

TECHNICAL FIELD

This invention generally relates to improvements in a process for manufacturing pneumatic tires and in tires manufactured in accordance therewith. More particularly, this invention is concerned with (a) improvements in a process for manufacturing pneumatic, radial-ply, tires, wherein each of the tires includes an improved pair of oppositely disposed beads and a ply extending therebetween and looped about the respective beads; and (b) tires manufactured in accordance with the improved process.

BACKGROUND OF THE INVENTION

The art of manufacturing a pneumatic tire has evolved over the years to include a number of widely used variations of a conventional process which includes the basic steps of: (a) selecting a plurality of raw materials, including chemicals, different kinds of rubber, woven elastomeric fabrics for plies, puncture resistant woven belts and steel wire for tire beads; (b) mixing the selected rubbers with various processing oils, carbon black, pigments, antioxidants, accelerators and other additives, to form different rubber compounds; (c) processing, rolling and cutting the rubber compounds for use in forming the innerliner, sidewalls, tread and other rubber components of the tire; (d) assembling the rubber components, plies, belts and beads together on the drum of a tire building machine, and, under heat and pressure, forming therefrom a "green" tire; (e) inserting the green tire into a vulcanizing mold; and (f) curing the green tire by expanding a bladder therewithin, through the introduction into the bladder of a high pressure medium at a sufficiently elevated temperature to vulcanize the green tire and to conform the tire to its final design shape, including the tire tread pattern and sidewall markings.

Despite numerous attempts to optimize the above described conventional manufacturing process, tires manufactured in accordance prior art processes continue to exhibit non-uniformities in their shape and other deficiencies in their physical characteristics, to which uneven tire wear is generally attributable. For example, it is not unusual to observe that when a prior art tire is mounted on a rim and inflated, the inner, radially-extending, heel seats of the opposed bead portions of the tire are not disposed in abutment with the outer, radially-extending, flange shoulders of the wheel rim, with the result that unbalanced forces are outwardly radially transmitted to the tire tread, causing the tread to become unevenly worn. In addition, due to unrelieved internal stresses developing in prior art tires, in the course of their manufacture, internal flow cracks have been observed to develop in one or the other of the opposed tread shoulders, causing the tires to become unevenly worn.

Of course, processes of manufacturing tires having various structural forms have been the subject of numerous prior art patents. For example: U.S. Pat. No. 3,900,061; U.S. Pat. No. 4,669,519; and U.S. Pat. No. 4,867,218 are directed to subject matter such as improvements in tire cornering performance, the reduction in tire rolling resistance, and the avoidance of the need for larger tire curing presses. In addition, U.S. Pat. No. 4,393,912, issued to Gouttebessis discloses a process of molding a pneumatic tire comprising a crown and opposed sidewalls, wherein each of the sidewalls is terminated by an unreinforced bead, wherein the tire is molded from liquid or paste materials which solidify between an outer mold and an inner core, and wherein the opposed beads are located axially outwardly of their mounted position on a wheel rim. Since the beads are so located, it is necessary to press the opposed bead portions axially toward one another when mounting the tire on the wheel rim.

Despite such steady improvements in tire construction and their manufacturing processes, as described by the prior art, there still exists a need for modifications of the conventional tire manufacturing processes to focus on relieving internal stresses that develop in tires in the course of their manufacture and on avoiding imparting internal stresses to tires in the course of mounting them on wheel rims. In this connection, it has been found that a major factor contributing to the build-up of stresses in prior art tires, is that the ply and rubber around the beads in the opposed bead portions of the tires have a tendency to twist the beads in the course of manufacture of the tires, generally due to the opposed bead portions being required to be moved toward one another in the course of manufacture of the tires. Such internal stresses tend to cause physical deformities and other physical deficiencies to develop in the resulting tires, causing the tire treads to become unevenly worn when in use. Moreover, internal stresses leading to uneven tread wear are developed in tires when the opposed bead portions of the tires are required to be moved toward one another to mount the tires on wheel rims.

SUMMARY OF THE INVENTION

A preferred embodiment of the present invention includes a pneumatic tire having a tread, and a carcass with a ply, oppositely disposed sidewalls extending radially-inwardly from opposite sides of tread and including an inner radial-end bead portion with an annulus made of bead wire and with the ply extending between and looped about each of the beads. Each of the beads includes an annulus made of a rubber filler forming a bead member with the bead wire annulus associated therewith. The bead member has a substantially circular transverse cross-section. Each of the beads includes a thermoplastic cover disposed in surrounding relationship the bead member thereof. Each of the thermoplastic covers includes an inner layer and an intermediate layer and an outer layer. The inner and outer layers of the thermoplastic cover are selected from a class of materials, e.g., a polymer plastic fabric, that soften at a lower temperature than the intermediate layer, e.g. a polyethylene film. Moreover, the inner and outer layers can be of one or more turns of a square-woven nylon fabric coated on both sides with an adhesive.

It is also within the terms of the present invention to provide a bead member for a pneumatic tire including a bead wire annulus and a thermoplastic cover disposed in surrounding relationship therewith. The bead includes a rubber filler annulus which, with the bead wire annulus, forms a bead member having a substantially circular transverse cross-section. The thermoplastic cover is characterized by an inner layer, an intermediate layer and an outer layer. The inner and outer layers of the thermoplastic cover are selected from a class of materials, e.g., a polymer plastic fabric, that soften at a lower temperature than the intermediate layer, e.g. a polyethylene film. Moreover, the inner and outer layers can be of one or more turns of a square-woven nylon fabric coated on both sides with an adhesive.

BRIEF DESCRIPTION OF THE DRAWINGS

As shown in the drawings, wherein like reference numerals designate like or corresponding parts throughout the several views:

FIG. 1 is one half of a transverse cross-sectional view of a prior art tire mounted on a wheel rim;

FIG. 2A is a transverse cross-sectional view of a prior art green tire assembly, after removal from a conventional second stage building drum;

DEFINITIONS

Figure 2B:
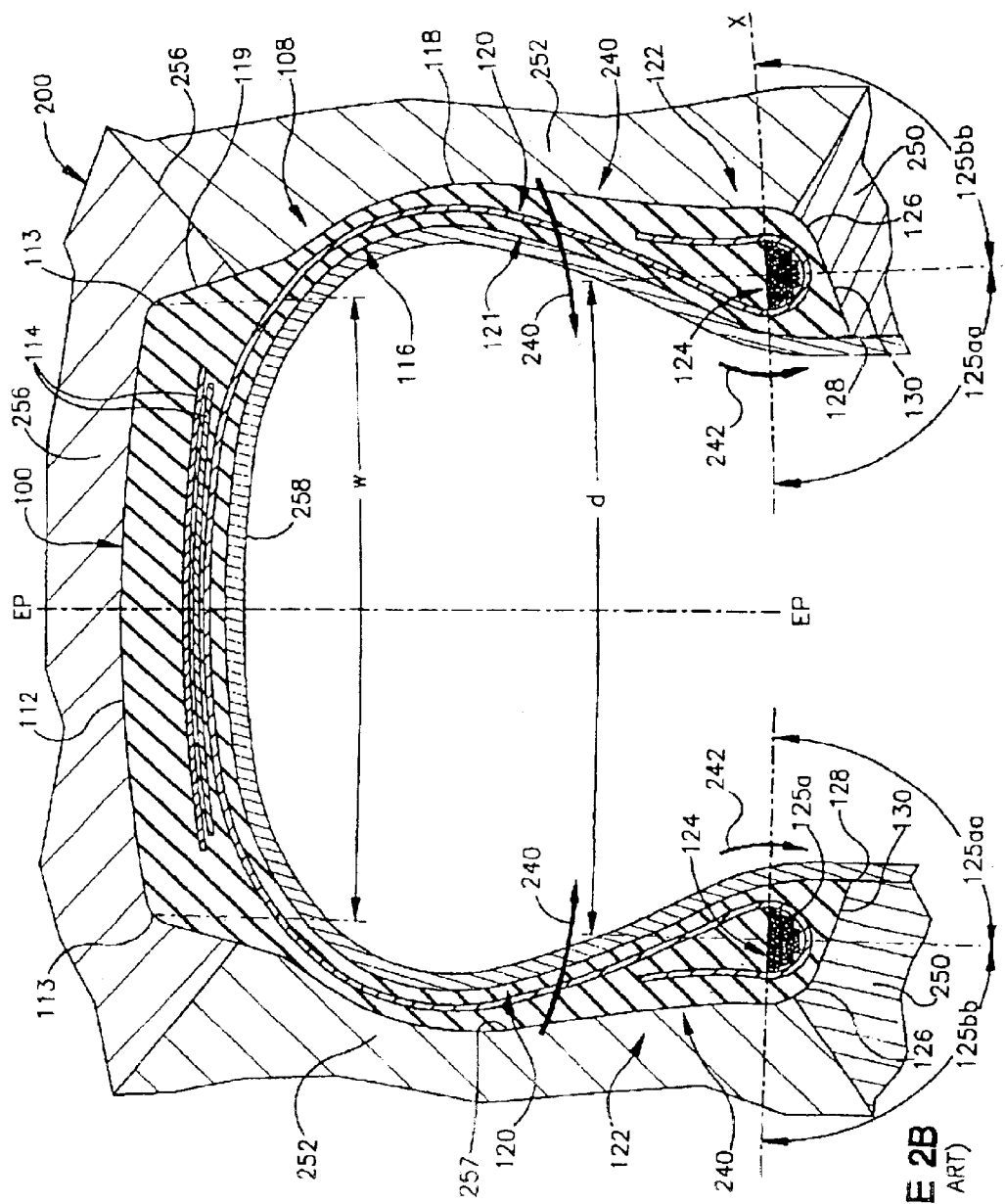
FIG. 2B is a transverse cross-sectional view of the prior art green tire a assembly of FIG. 2A inserted into a vulcanization mold.

"Axial" or "Axially" means the lines or directions extending parallel to the axis of rotation of a tire.

"Bead" generally means of annularly-shaped, member located within either of the inner radial end portions of a tire.

"Bead Portion" generally means either of the opposed radial inner end portions of the carcass of a tire including a bead, the portion of a ply which is looped about the bead, and the rubber material surrounding the bead and ply portion.

"Carcass" generally means the tire structure including the beads and ply, but excluding the belt structure, undertread over the ply and the tread.

"Circumferential" means the lines or directions circularly-extending along the perimeter of the surface of the tire tread and perpendicular to the axial direction; or t the lines or directions of a set of adjacent circles whose radii define the curvature of the tire tread as viewed in a transverse cross-section.

"Equatorial Plane" means the imaginary plane extending perpendicular to the axis of rotation of the tire and passing through the center of the tread; or the plane containing the circumferential centerline of the tread.

"Ply" generally means a cord-reinforced layer of rubber-coated, radially deployed material.

"Radial" mean directions extending radially toward or away from the axis of rotation of the tire.

"Sidewall" generally means the radially-extending portion of a tire.

"Toe" generally means the elastomeric, rim-contacting, radial inner end of the bead portion of the tire, extending axially inward of each bead.

"Tread width" means the arc length of the outer circumference of the tread of a tire as viewed in transverse cross-section.

DESCRIPTION OF THE PREFERRED EMBODIMENTS

FIG. 1 shows half of a transverse cross-sectional view of a prior art tire 100 mounted on a wheel rim 102 having a flange shoulder 104. Since the transverse cross-section of the other half of the prior art tire 100 is the mirror image of the view shown in FIG. 1, and thus includes like or corresponding parts, it will be assumed, for the purposes of this patent application that both halves of the prior art tire 100 are shown in FIG. 1.

Accordingly, a typical prior art tire 100 (FIG. 1) comprises a central tread 112 having opposed sides, generally indicated by the numeral 113. In addition, the tire 100 includes a pair of belts 114, disposed beneath the tread 112, and a carcass 116. The carcass 116 includes a pair of oppositely disposed sidewalls 118, respectively merging with and radially-extending inwardly from the respective opposed sides 113 of the tread 112 and forming therewith a shoulder portion, generally indicated by the numeral 119. The carcass 116 also includes a ply 120, having opposed side portions 120a, and an innerliner 121, and includes a pair of oppositely disposed bead portions 122 at the radial inner ends of the opposed sidewalls 118. Each of bead portions 122 includes and an annularly-shaped bead 124 disposed there within. Further, each of the bead portions 122 includes an annularly-shaped heel 126 and toe 128, and a flat heel seat 130 extending between the heel 126 and toe 128. The bead 124 of the prior art tire 100 is a substantially inextensible annulus of made of steel bead wire 144, for retaining the heel seat 130 in abutment with the flat, annularly-shaped flange shoulder 104 of a wheel rim 102. The ply 120, extends between the beads 124 and has opposite side portions 120a thereof respectively looped about the respective beads 124.

In the typical prior art tire 100 (FIG. 1), each of the beads 124 includes a plurality of parallel rows 145 of the steel bead wire 144 and has a substantially semi-circular transverse cross-section. The parallel rows 145 (FIG. 2A) of bead wire 144 preferably describe and an angle "a" of 15 degrees with respect to the axial direction of rotation "x" of the tire 100, to match the corresponding 15 degree angle "c"(FIG. 1) that the flange shoulder 132 of the wheel rim 134 describes with respect to the axial direction of rotation "x1" of the wheel rim 134. However, as hereinbefore discussed, when the prior art tire 100 is mounted on the wheel rim 133, the angle "a" (FIG. 2) has been observed to be substantially less than 15 degrees, for example as little a zero degrees as shown in FIG. 1, due to physical deficiencies of the tire 100 resulting from internal stresses developed therein in the course of manufacture thereof, as hereinafter described in greater detail.

The prior art tire manufacturing process includes the steps of: (a) building the tire carcass 116 (FIG. 1) on a first stage tire building drum (not shown); (b) expanding the tire carcass 116 into a package of belts 114 and a tread 112 on a second stage tire building drum (not shown) to form a green tire assembly 108 (FIG. 2A); (c) inserting the tire assembly 108 into a vulcanizing mold 200 (FIG. 2B); (d) curing the tire assembly 108 (FIG. 2A) in the mold 200 through the use of a high-pressure medium at a sufficiently elevated temperature to vulcanize the tire assembly 108; and (e) removing the cured tire 100 (FIG. 2B) from the vulcanizing mold 200, and allowing the cured tire 100 to cool to ambient temperature.

As shown in FIG. 2B, the vulcanizing mold 200 includes oppositely disposed mold rings 250 and plate 252 and a tread ring 256, which together define an inner surface 257 of the mold 200. When the green tire assembly 108 is mounted in the mold 200, the mold rings 252 press against the bead portions 122 of the green tire assembly (FIG. 2A), thereby forcing the opposed bead portions 122 (FIG. 2B) axially toward one another, symmetrically with respect to the equatorial plane (EP) of the tire assembly 118, as indicated by arrows 240. Thereafter, a bladder 258 is inflated within the tire assembly 108, through the introduction into the bladder 258 of a medium, typically steam, at a sufficiently high pressure and elevated temperature to firmly press the tire assembly 108 against the inner surface 257 of the mold 200 and vulcanize the tire assembly, thereby forming a cured tire 100 FIG. 1 having a final design shape, including a tread pattern and sidewall markings.

Within the mold 200 (FIG. 2), the axial distance "d" between the beads 124 is ideally the same as the spacing therebetween when the cured tire 100 (FIG. 1) is mounted on the wheel rim 102. Moreover the bead spacing distance "d" is ideally the same as the tread width "w" (FIG. 2) of the tire tread 112. In die course of manufacture of an exemplary passenger tire 100, when the green tire assembly 102 (FIG. 2B) is removed from the second stage building drum (not shown), the bead spacing "e" is typically about 15 inches (38 cm). When the tire assembly 108 is mounted within the vulcanization mold 200 (FIG. 2B) the bead spacing distance "d" is typically 7.5 inches (19 cm). However, when the cured tire 100 is removed from the vulcanization mold 200, although the tread width "w" is typically 7.5 inches, the bead spacing distance "d" is typically 7.5 inches (19 cm) to 8 inches (20 cm). And, when the cured tire 100 is mounted on a wheel rim 134 (FIG. 1), the bead spacing distance "e" is typically about 7.5 inches (19 cm).

In general, as result of the bead portion 122 of the green tire assembly 108 being moved toward one another before vulcanization of 108, internal stresses develop at the interfaces between the ply 120 and the surrounding green rubber material forming the sidewalls 118 and innerliner 121, causing the sidewalls 118 to become compressed and the innerliner to become stretched. In addition, internal stresses develop between the sidewalls 118 and the bead portions 122 causing internal buckling to occur. Moreover internal stresses develop in the bead port ions 122 at the interfaces between looped portions of the ply 120 and the green rubber material in surrounding relationship therewith, and between the opposed beads 124 and surrounding rubber material causing the bead portions 122 to be unstable.

Due to the ply 120 being looped about the respective beads 124, and the rubber material of the tire assembly 108 being disposed in surrounding relationship with the beads 124 and ply 120, when the opposed bead portions 122 are axially moved toward one another within the vulcanization mold 200, the surrounding rubber material adheres to the beads 124 and ply 120, and exerts oppositely directed rotational forces, shown by the arrows 242 (FIG. 2B), on the opposed beads 124, tending to rotate the respective beads 124 in the opposite directions indicated forces 242. On the other hand, such rotational forces 242 are to some extent offset due to the axially inwardly facing sections 125a of the respective beads 124, corresponding to the opposed inwardly facing portions of the transverse cross-section of each of the beads 124. These inwardly facing sections 125a are restrained from such rotation since such sections 125a have a shorter circumferentially-extending arc length 125aa than the arc length 125bb of the axially outwardly facing portions 125b of the transverse cross-section of each of the beads 124. Such rotation of the opposed beads 124, is not possible, since it tends to force the inwardly and outwardly facing bead sections, 124a and 124b, to respectively assume longer and shorter circumferentially-extending arc lengths than their original circumferentially-extending arc lengths 124aa and 124bb. In any event, the resulting rotational and counter-rotational forces cause internal stresses to develop in the opposed bead portions 124, causing the opposed beads 124 to rotate sufficiently to reduce the ideal 15 degree angle "a" (FIG. 2A) of the bead rows 145 before curing the green tire assembly 108, to the less than ideal angle of the bead rows 145, such as zero degrees as shown in FIG. 1, after curing the green tire assembly 108. Accordingly, the locations of the opposed beads 124 with respect to one another are unstable, as they are continuously under stress to return to their original orientation in the green tire assembly 108 (FIG. 2A) before insertion thereof into the vulcanizing mold 200, with the result that such tires tend to become nonsymmetrical.

As discussed above, various stresses causing the physical deformations and other deficiencies in prior art processes are traceable to deficiencies in the prior art process of manufacturing such tires 100 (FIG. 1). In particular, the prior art process tends to produce tires 100 which arc not symmetrical with respect to the Equatorial Plane (EP) of an ideal tire, causing uneven tread wear and shorter tire life. Moreover, although the green tire material can allow for some movement to compensate for the tendency of prior art tire 100 develop physical defects, the flow cracks; and buckling are widespread in prior art tires 100, causing uneven tread wear and shorter tire life. St ill further, the problem of uneven wear of the tread 112 of prior art tires 100 constructed in accordance with the conventional manufacturing process has, in part, been found to be due to poor seating of the opposed tire bead portions 122 on the wheel-rim 102. When the tire 100 is poorly seated on the wheel-rim shoulder 104, unbalanced forces are radically transmitted to the tread 112, causing the tread to become unevenly worn and the thereby shortening the life of the tire 100.

PREFERRED EMBODIMENT

Figure 3:
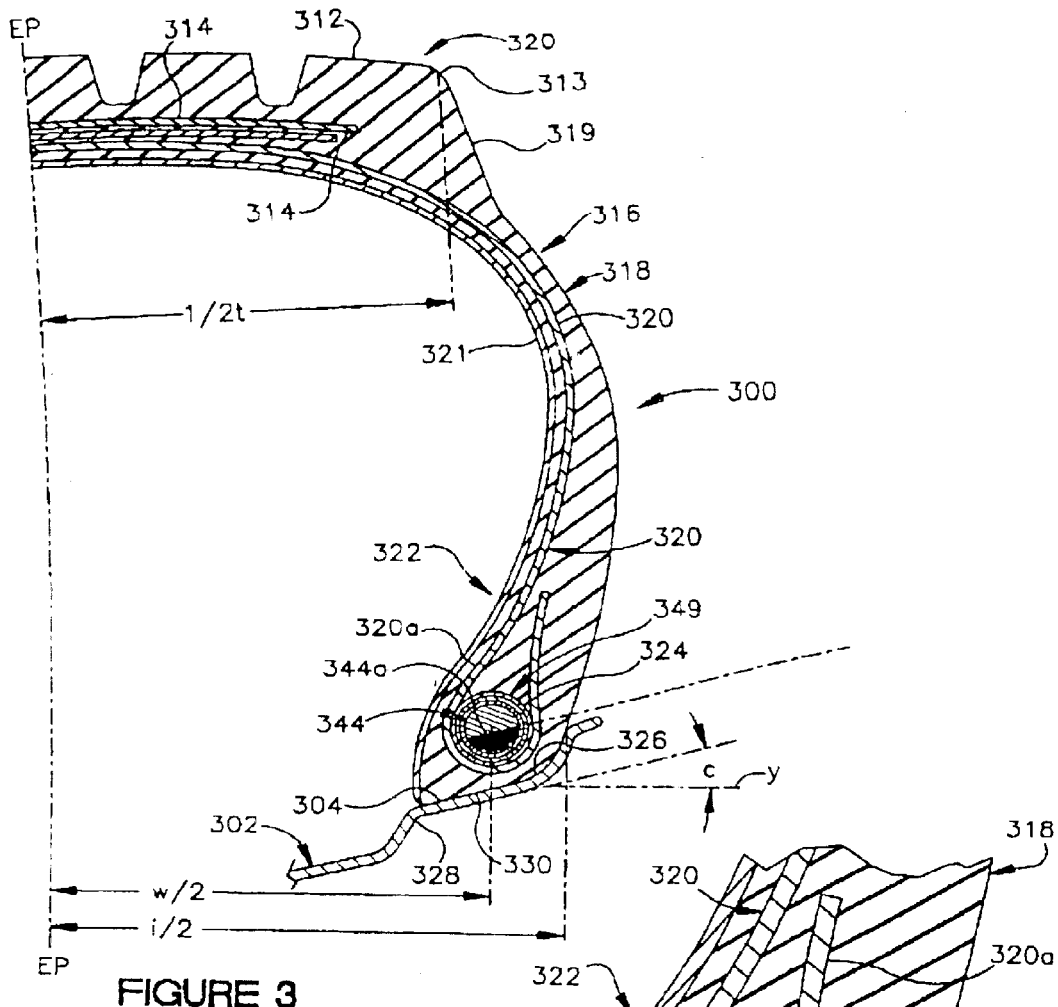
FIG. 3 is a one-half, transverse cross-sectional view of a tire according to the invention, including a bead portion thereof mounted on a wheel rim.

FIG. 3 shows half of a transverse cross-sectional view of a tire 300 according to the invention mounted on a wheel rim 302 having a flange shoulder 304. Since the transverse cross-section of the other half of the tire 300 is the mirror image of the view shown in FIG. 3, and thus includes like or corresponding parts, it can be understood, for the purposes of this patent application, that the half or the transverse cross-section of the tire 300 not shown is substantially identical to the half shown in FIG. 3.

Accordingly, the tire 300 comprises a central tread 312 having opposed sides, generally indicated by the numeral 313. In addition the tire 300 includes at least one belt 312, disposed beneath the tread 312 and a carcass 316. The carcass 316 includes a pair of oppositely disposed sidewalls 318, respectively merging with and radially-extending inwardly from opposite sides 313 of the tread 312 and forming therewith a shoulder portion, generally indicated by the numeral 319. The carcass 316 also includes at least one ply 320, having opposite side portions 320a, and includes an innerliner 321. Further, the carcass 316 includes oppositely disposed bead portions 322 at the radial inner ends of the sidewalls 318. Each of the bend portions 322 includes an annularly-shaped bead 324. And, the at least one ply 320 extends between the opposed beads 324. Moreover, the respective side portions 320a of the ply 320 are looped about opposite beads 324. Further, each of the bead portions 322 includes an annularly-shaped heel 326 and toe 328 and flat heel seat 330 extending between the heel 326 and toe 328. As thus constructed and arranged, when the tire 300 is mounted on the wheel rim 302, the bead 324 retains the heel seat 330 in abutment with the flat, annularly-shaped, wheel-rim shoulder 304.

According to the invention, each of the beads 324 (FIG. 3A) includes a substantially inextensible annulus 344 of steel bead wire 344A having a substantially semi-circular transverse cross-section. The bead wire 344A is preferably arranged in the form of a plurality of parallel rows, 345a, 345b, 345c, and 345d, respectively describing an angle "aa" of substantially 15 degrees with respect to an axial direction of rotation "x" of the tire 300, to match the substantially 15 degree angle "c" (FIG. 3) that the flange shoulder 304 describes with respect to the axial direction of rotation "y" of the wheel rim 302.

In addition, each of the beads 324 (FIG. 3A) includes an annulus 347 made of rubber filler 347a having a substantially semi-circular transverse cross-section. The rubber filler annulus 347, is preferably curable to a hard rubber consistency, such as chafer rubber, and, although preferably cured with the remainder of the tire 300, may be cured prior thereto without departing from the spirit and scope of the invention. Accordingly, the rubber filler annulus 347 may be either cured or green when assembled with the bead wire annulus 344. Preferably, the rubber filler annulus 347 is radially disposed outwardly of, and in abutment with, the bead wire annulus 344 and forms therewith a bead member 348 having a substantially circular transverse cross-section. Without departing from the spirit and scope of the invention, the respective transverse cross-sections of the annuli, 344 and 347, may respectively have any transverse cross-section consistent with retaining a combined transverse cross-section which is substantially circular.

Figure 3A:
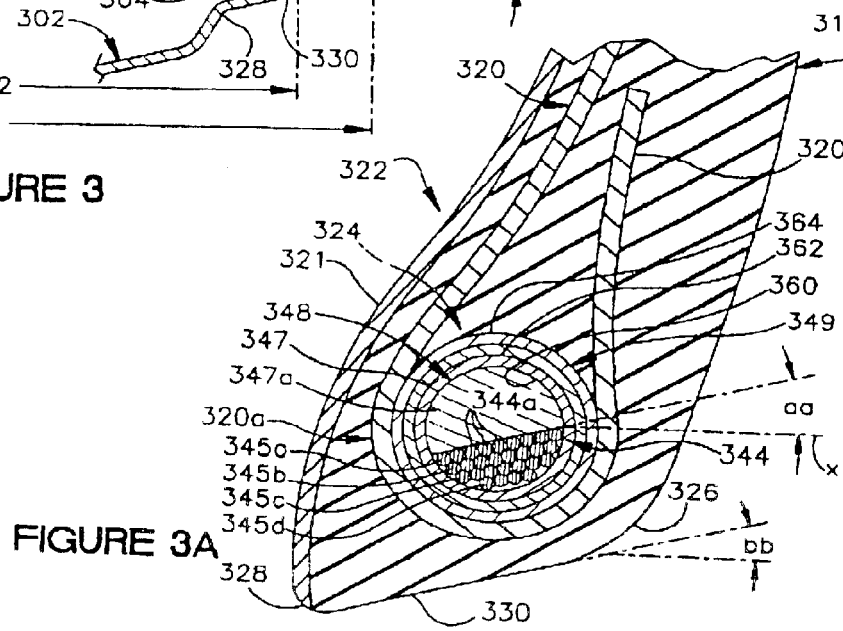
FIG. 3A is an enlarged view of the bead portion of FIG. 3.

As shown in FIG. 3A, each of the beads 324 preferably additionally includes a thermoplastic cover 349 disposed in surrounding relationship with the bead member 348, as by wrapping the thermoplastic cover 349 around the annuli 344 and 347. The thermoplastic cover 349 preferably comprises an inner layer 360, made of a polymer plastic fabric which is coated on both sides with an adhesive, such as rubber cement, an intermediate layer 362, made of a polyethylene film, and an outer layer 364, made of polymer plastic fabric which is coated on both sides with an adhesive, such as rubber cement. More particularly, the inner and outer layers, 360 and 364, are preferably formed from one or more turns of a square-woven nylon fabric coated on both sides with an adhesive such as rubber cement. And the intermediate layer 362 is preferably formed from one of a class of materials that soften at a lower temperature than the inner and outer thermoplastic layers 360 and 364 to permit slippage therebetween when the intermediate layer 362 is hot, and thus during the processing steps of curing and cooling the tire 300. In addition, in the preferred embodiment of the process, when the adhesive coating is applied to the opposite sides, respectively, of the inner and outer thermoplastic layers, 360 and 364, it is preferably tacky. This tackiness ensures, a) that inner layer 360 adheres on contact to the bead member 348 and to the intermediate layer 362, and b) that the outer layer 364 adheres on contact to the intermediate layer 362 and to the rubber material surrounding the bead 324. As thus constructed and arranged, the thermoplastic cover 349 protects the bead member 348 against deformation in the course of manufacture of the tire 300, with the result that there is no need to pre-cure the rubber filler annulus 347.

Figure 4A:
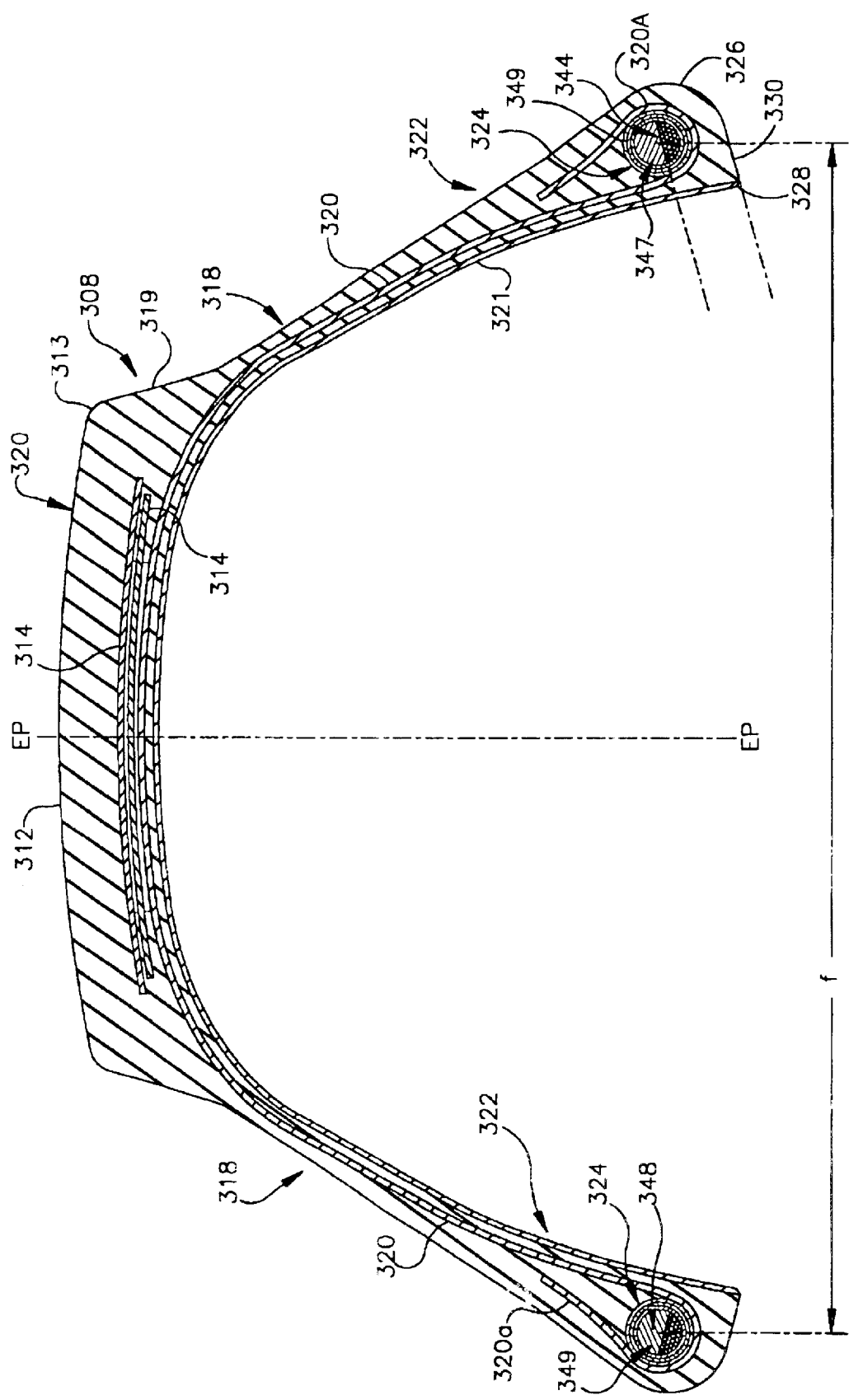
FIG. 4A is a transverse cross-sectional view of the green tire assembly according to the invention, after removal from a second stage building drum.

A process of manufacturing a tire (FIG. 3) according to the invention comprises the steps of: (a) building a tire carcass 316, generally including the opposed sidewalls 318, a ply 320, an innerliner 321 and opposed beads 324, on a first stage tire building drum (not shown); (b) expanding the tire carcass 316 into a tread package, including at least one belt 314 and a tread 312, on a second stage tire building drum (not shown) to form a green tire assembly 308 (FIG. 4A), having a bead spacing distance "f"; (c) inserting the tire assembly 308 into a vulcanization mold 400 (FIG. 4B); wherein the axial distance "g" between the opposed beads 324 is substantially equal to the distance "f" therebetween when the green tire assembly 308 was removed from the second stage building drum; (d) curing the green tire assembly 308 through the use of a high-pressure medium at a sufficiently elevated temperature to press the tire assembly 308 against the mold 300 and to vulcanize the tire assembly 308; (e) removing the cured tire 300 from the vulcanizing mold 400 while the tire 300 is still hot; (f) mounting the cured tire 300, while hot, on a conventional Post Cure Inflation (PCI) Stand 460 (FIG. 4C), wherein the distance "h" between the opposed beads 324 is substantially equal to the distance "i" (FIG. 3) therebetween when the tire 300 is subsequently cooled and mounted on a wheel rim 302: (g) inflating the hot tire 300 (FIG. 4C), while mounted on the PCI Stand; and (h) allowing the inflated tire 300 to cool to ambient temperature.

When the green tire assembly 308 (FIG. 4B) is initially mounted in the vulcanization mold 400, the mold rings 450 are moved upwardly against and in supporting relationship with the opposed bead portions 322. Thereafter, a bladder 452 is inflated within the green tire assembly 308, through the introduction there into of a high pressure medium at an elevated temperature, to press the green tire assembly 308 against the inner surface 451 of the mold 400 and to vulcanize the tire assembly 308. Preferably, high pressure steam is used as the medium for inflating the tire assembly 308 And the vulcanization temperature is within the range of from substantially 250 to 350 degrees Fahrenheit (121 to 177 degrees C), and preferably substantially 300 degrees Fahrenheit (149 degrees C). While the green tire assembly 308 is being vulcanized, the bead spacing distance "g" between opposed beads 324 is substantially equal to the bead spacing distance "f" therebetween when the green tire assembly 308 was removed from the second stage building drum (not shown). The distance "f", is defined as the spacing between the beads of the green tire immediately after the tire is removed from the second stage tire building machine (not shown). In practice, although the bead spacing distance "g" of the tire assembly 308, as mounted in the mold 400, may be slightly less than the bead spacing distance "f" of the tire assembly 308 when removed from the second stage building drum (not shown), the differences between the bead spacing distances "f" and "g" may still be the to be substantially unchanged. The bead spacing distance "g" of the tire assembly 308 can be defined as 100% to 200% of the distance "h", corresponding to the distance between the beads when the tire is mounted on a tire rim.

Thus the internal rotational and counter-rotational forces developed in the prior art tire 100 (FIG. 2B), which are attributable to moving the opposed beads 124 toward one another in the course of manufacture of the tires 100 have been substantially completely eliminated from tires 300 (FIG. 3) manufactured in accordance with the present invention. In particular, maintaining the bead spacing distances "f" and "g" substantially unchanged while the tire assembly 302 is still in the somewhat delicate green state substantially completely eliminates the development of the internal stresses, which give rise to the development of internal buckling and flow cracks.

The resulting toroidally-shaped, cured tire 300 (FIG. 4C), having a conventional tread pattern and sidewall markings, is then mounted on the PCI Stand 460 while still hot, and thus at the aforementioned temperature within the range of from substantially 250 to 350 degrees F. (121 to 177 degrees C), and preferably 300 degrees F (149 degrees C). The PCI Stand 460 includes a pair of oppositely disposed rims 348 which are conventionally movable toward and away from one another. When the cured tire 300 (FIG. 4C) is initially mounted on the PCI Stand 460, the opposed rims 348 thereof are axially moved toward and into abutment with the opposed head portions 322, and then a sufficient distance thereafter to achieve the bead spacing distance "h" which is substantially equal to the distance "i" (FIG. 3) of the tire 300 when mounted on a tire rim 302. Whereupon the angle "k" that the respective bead wire rows, 345a, 345b, 345c and 345d, and heel seat 330, describe with respect to an axial direction "x" of the tire 300, extend substantially parallel to the angle "c" that the flange shoulder 304 describes with respect to an axial direction 'y' of the wheel rim 302. Thereafter while the cured tire 300 (FIG. 4C) is still as hot as hereinbefore noted, the tire 300 is inflated to a pressure of from substantially 25% to 125% of the normal operating pressure thereof to comform the cured tire 300 to the toroidal shape thereof when mounted on the wheel rim 300 (FIG. 3).

Figure 4B:
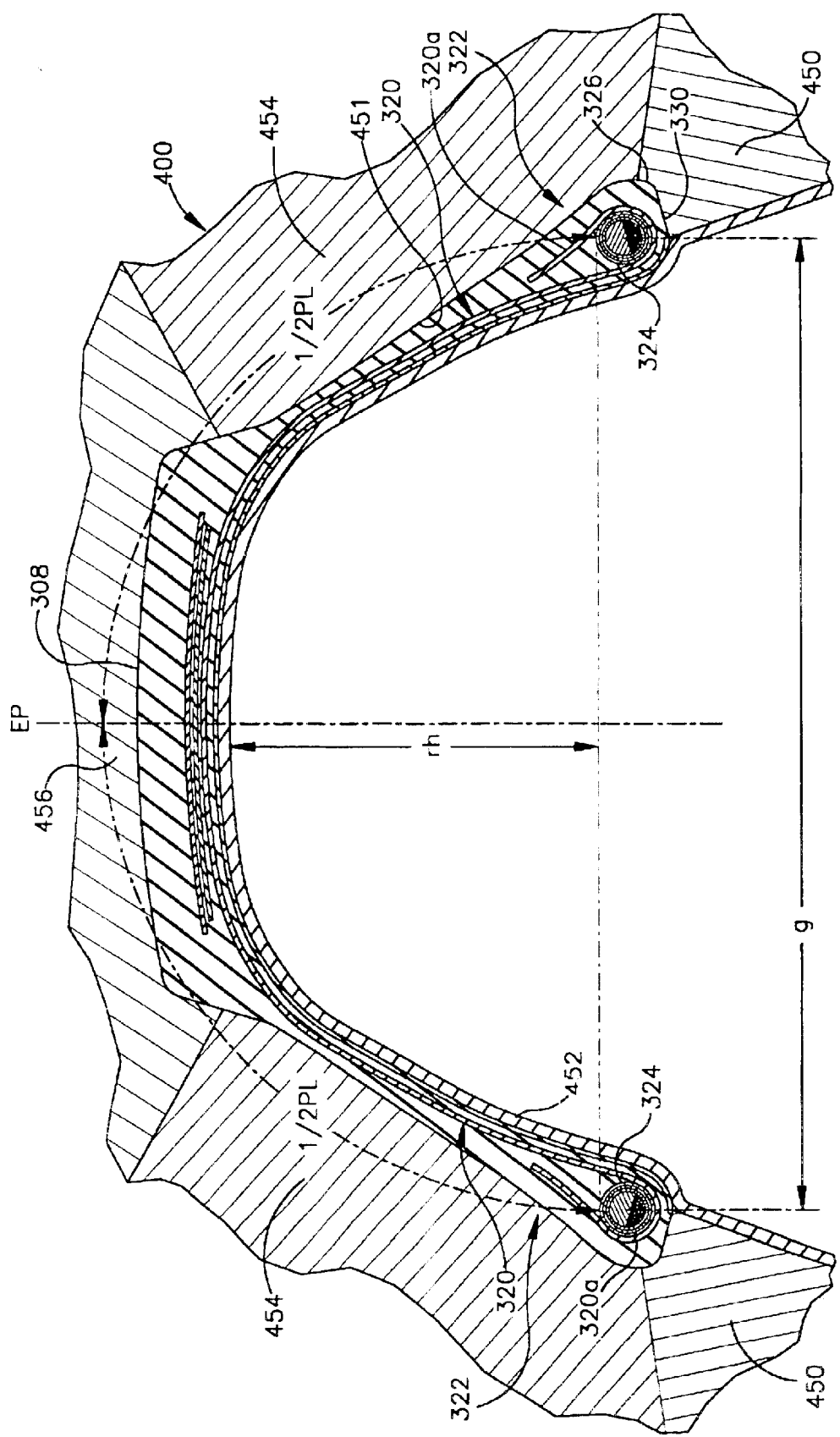
FIG. 4B is a transverse cross-sectional view of the green tire assembly of FIG. 4A inserted into a vulcanizing mold.
Figure 4C:
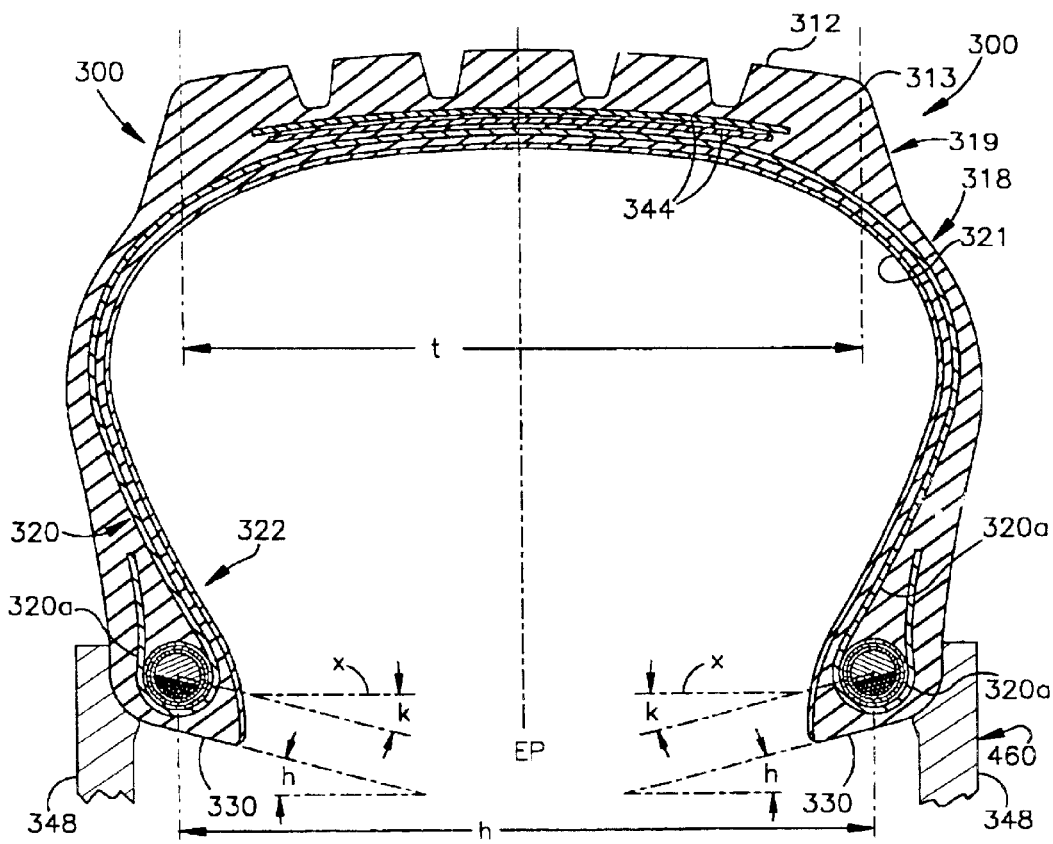
FIG. 4C is a transverse cross-sectional view of the vulcanized tire assembly of FIG. 4A, as mounted, while still hot, on a Post Cure Inflation (PCI) Stand.

In an exemplary passenger tire 300 manufactured according to the present invention, having a 7.5 inch (19 cm) tread width "t" (FIG. 4C, the opposed beads 324 may be separated by a distance "f" of 15 inches (38 cm) after removal from the second stage building drum, a distance "g" of 15 inches (38 cm) when in the vulcanizing mold (FIG. 4B), a distance "h" of 7.5 inches (19 cm) when mounted on the PCI Stand (FIG. 4C), and a distance "i" of 7.5 inches (19 cm) when mounted on the wheel rim 302 (FIG. 3).

Although the bead-spacing distance "g" of the cured tire 300 when mounted in the vulcanization mold (FIG. 4B), was reduced to the bead spacing distance "h" when mounted on the PCI Stand (FIG. 4C), due to the respective sidewalls 318 and bead portions 322 having been moved toward one another for mounting the cured tire 300 on the PCI stand 460, such movements occurred while the temperature of the cued tire 300 was at the elevated temperature hereinbefore discussed. As a result, the outer layer 364 of the thermoplastic cover 349 was able to rotate relative the inner layer 360 thereof, because the intermediate layer 362 thereof having been liquefied and providing a slippage medium between the respective inner and outer thermoplastic layers, 362 and 364. And, due to such slippage, the molecules of the rubber materials surrounding bead 324 and ply 320 were able to establish a state of equilibrium relative to one another to relieve the internal stresses that would otherwise have developed in the sidewalls 318 and bead portions 322 of the cured tire 300.

Accordingly, a tire 300 having the improved bead 324 and manufactured in accordance with the aforesaid process is substantially free of the internal rotational and counter-rotational stresses found in prior an tires 100. In this connection, it is noted that the improved tire 300 has not been observed to be physically misshapen or otherwise deformed due to internal stresses developing therein in the course of manufacture thereof. Nor have the improved tires 300 been observed to have developed internal buckling or flow cracks as commonly found in prior art tires 100. Moreover, when the improved tires 300 are mounted on a wheel rim 302, the respective heel seats 330 have been observed to be properly mounted in abutment with the respective wheel-rim shoulders 304, with the result that balanced forces, rather than the unbalanced forces of prior art tires 100, are transmitted to the wheel treads 312. Thus improved tires 300 manufactured in accordance with the improved process, are substantially free of internal stresses developed in the course of their manufacture and are substantially free of physical deformities and other physical deficiencies of prior art tires 300.

Figure 5:
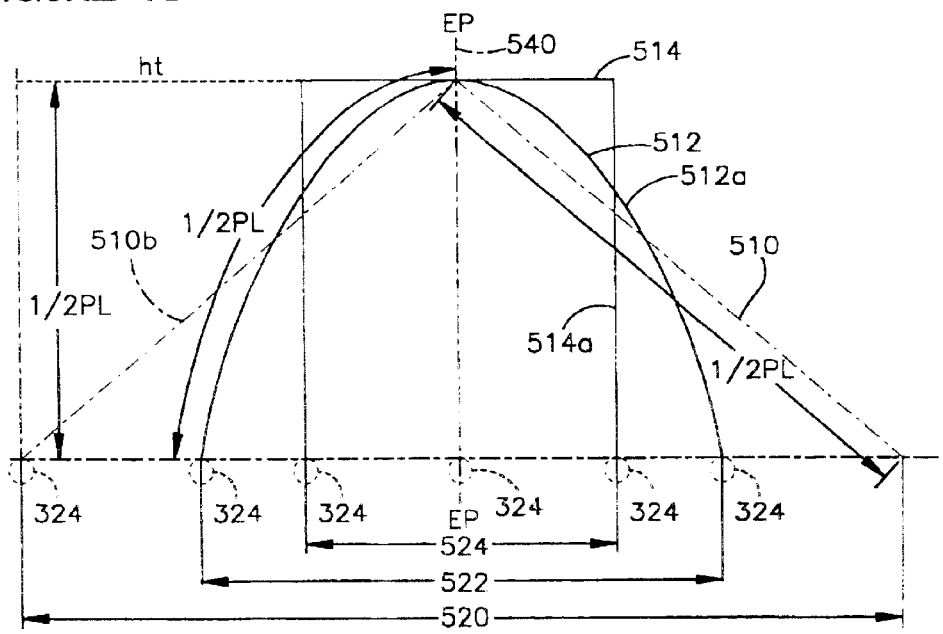
FIG. 5 is an illustration of geometric logic diagram considered in the course of determining bead spacings of tires.

The theoretical tire geometry diagram shown in FIG. 5 was considered in the course of determining the bead spacing of the improved tire 300 when mounted in the vulcanization mold 400 (FIG. 4B). The diagram demonstrates the range of the bead placement to alleviate the disadvantage in the improved process of developing internal stresses in the shoulder portions 319 of the improved tire 300 when the beads are moved toward one another for mounting the tire 300 on the PCI Stand (FIG. 4C). As hereinafter discussed, the aforesaid disadvantage may be minimized by slightly reducing the bead spacing distance "g" within the mold 400, as compared to the spacing distance "g" hereinbefore discussed in the above embodiment of the invention.

When the green tire assembly 308 (FIG. 4B) is mounted in the vulcanizing mold 400, there are three constraints imposed on the tire assembly 308 by the mold 400: 1) the tire assembly 308 is maintained symmetrical with respect to the Equatorial Plane (EP); 2) the radial height "rh" (FIG. 3) between the outer diameter of each of the beads 324 to the center of the innerliner 321 of the tire 300, is set; and 3) the curvedly-extending length (PL) of the ply 320, as measured between the respective outer diameters of the opposed beads 324, is set. Thus, the three constraints are the symmetry, set radial height "rh" and set ply length (PL)

The three geometric forms 500 shown in FIG. 5 correspond to three different theoretical forms of a pneumatic tire in a theoretical vulcanization mold (not shown). The geometric forms 500 include a triangle 510 having a base 520, a rectangle 514 having a base 524, and half of an ellipse 512 having a base 522. The triangle 510 has a pair of opposed sides, 510a and 510b, the rectangle 512 has a pair of opposed sides, 512a and 512b, and the ellipse 514 has a pair of opposed sides, 514a and 514b. Each pair of the aforesaid opposed sides is symmetrically located relative to the Equatorial Plane (EP) of the geometric forms. In addition, each of the geometric forms 500 shares the same height "ht", as measured along the Equatorial Plane (EP), and has the same Perimeter Length (PL). The shared height "ht" of the respective geometric forms corresponds the set radial height "rh" within the mold, the shared Equatorial Plane (EP) of the geometric forms corresponds to the Equatorial Plane (EP) of the tire assembly 308 within the mold, and the Perimeter Lengths (PL) of the geometric forms each correspond to the set ply length (PL) between the outer diameters of the opposed beads 324.

As shown in FIGS. 4B and 5, given the constraints discussed above, the theoretical maximum distance "g" between the beads 324, when a green tire assembly is mounted in a theoretical vulcanizing mold corresponds to the base 524 of the triangle 510, which would call for the ply 320 to assume a shape of the opposed sidewalls, 510a and 510b, of the triangle 510. If the cured tire assembly 308 having a ply 320 shaped like the triangle 510 was mounted on a conventional PCI Stand 460 and inflated, severe internal stresses would be developed in the shoulder portions 319 of the tire 300. Moreover, the same may be said for a tire 300 having a minimum spacing "g" between the beads 324, corresponding to the base 524 of the rectangle 512, since that would call for the ply 320 to assume a shape corresponding to the rectangle 512. However, providing a cured tire 300 with a bead spacing distance "g", corresponding to the base 522 of the ellipse 514 would call for the ply 320 to assume a shape corresponding to the ellipse 514. And, if a tire 300 having a ply 320 shaped like an ellipse 514 was mounted on a conventional PCI Stand 460 and inflated, minimal, if any, internal stresses would be developed in the shoulder portions 319 of the tire 300, although more stress would be developed in the bead area of a theoretical tire having the shape of half an ellipse. On balance, molding the tire 300 according to the invention with a bead spacing distance "g" corresponding to the base 522 of the ellipse 514 is an acceptable compromise.

Although the inventions described herein have been shown in a few embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic tire having a tread and a carcass with a ply, oppositely disposed sidewalls extending radially-inwardly from opposite sides of tread and including an inner radial-end bead portion with an annulus made of bead wire and with the ply extending between and looped about each of the beads; the tire characterized by;

each of the beads including an annulus made of a rubber filler forming a bead member with the bead wire annulus associated therewith, the bead member having a substantially circular traverse cross-section, each of the beads including a thermoplastic cover disposed in surrounding relationship with the bead member thereof, and each of the thermoplastic covers including an inner layer and an intermediate layer and an outer layer and wherein the intermediate layer is selected from a class of materials that soften at a lower temperature than the inner and outer layers.

2. A pneumatic tire having a tread and a carcass with a ply, oppositely disposed sidewalls extending radially-inwardly from opposite sides of tread and including an inner radial-end bead portion with an annulus made of bead wire and with the ply extending between and looped about each of the beads: the tire characterize by:

each of the beads including an annulus made of a rubber filler forming a bead member with the bead wire annulus associated therewith, the bead member having a substantially circular transverse cross-section, each of the beads including a thermoplastic cover disposed in surrounding relationship with the bead member thereof and each of the thermoplastic covers including an inner layer and an intermediate layer and an outer layer, and wherein the inner and outer layers of the thermoplastic cover are of a polymer plastic fibric and the intermediate layer is a polyethylene film.

3. The tire as recited in claim 1, wherein the inner and outer layers are of one or more turns of a square-woven nylon fabric coated on both sides with an adhesive.

4. A bead for use in a process for manufacturing a pneumatic tire characterized by:

the bead including a bead wire annulus and an annulus made of a rubber filler, the bead wire annulus and the rubber filler annulus forming a bead member having, a substantially circular transverse cross-section, the bead member including a thermoplastic cover disposed in surrounding relationship therewith, the thermoplastic cover including an inner layer, an intermediate layer and an outer layer; and wherein the intermediate layer is selected from a class of materials that soften at a lower temperature than the inner and outer layers.

5. A bead for use in a process for manufacturing a pneumatic tire characterized by:

the bead including a bead wire annulus and an annulus made of a rubber filler, the bead wire annulus arid the rubber fill annulus forming a bead member having a substantially circular transverse cross-section, the bead member including a thermoplastic cover disposed in surrounding relationship, therewith, the thermoplastic cover including an inner layer, an intermediate layer and an outer layer; and wherein the inner and outer layers of the thermoplastic cover arm of a polymer plastic fabric and the intermediate layer is a polyethylene film.

6. The bead as recited in claim 4, wherein the inner and outer layers arc of one or more turns of a square-woven nylon fabric coated on both sides with an adhesive.

7. A bead for use in a process for manufacturing a pneumatic tire characterized by:

the bead including a bead wire annulus and an annulus made of a rubber filler, the bead wire annulus and the rubber filler annulus forming a bead member having a substantially circular transverse cross-section, the bead member including a thermoplastic cover disposed in surrounding relationship therewith, the thermoplastic cover including an inner layer, an intermediate layer and an outer layer; and wherein the inner layer of the thermoplastic cover is a polymer plastic fabric that does not cure during vulcanization of the tire.

8. A bead for use in a process for manufacturing a pneumatic tire wherein:

the bead includes a bead wire annulus and a thermoplastic cover disposed in surrounding relationship therewith; and the thermoplastic cover is characterized by an inner layer, an intermediate layer and an outer layer;

characterized in that:

the intermediate layer is selected from a class of materials that soften at a lower temperature than the inner and outer layers.

9. The bead as recited in claim 8, wherein the inner and outer layer of the thermoplastic cover arc of a polymer plastic fabric and the intermediate layer is a polyethylene film.

10. The bead as recited in claim 8, wherein the inner and outer layers are of one or more turns of a square-woven nylon fabric coated on both sides with an adhesive.

* * * * *